Feb. 8, 1927.
L. A. TUSSING
1,616,559
SPRING SUSPENSION MEANS
Filed July 6, 1925
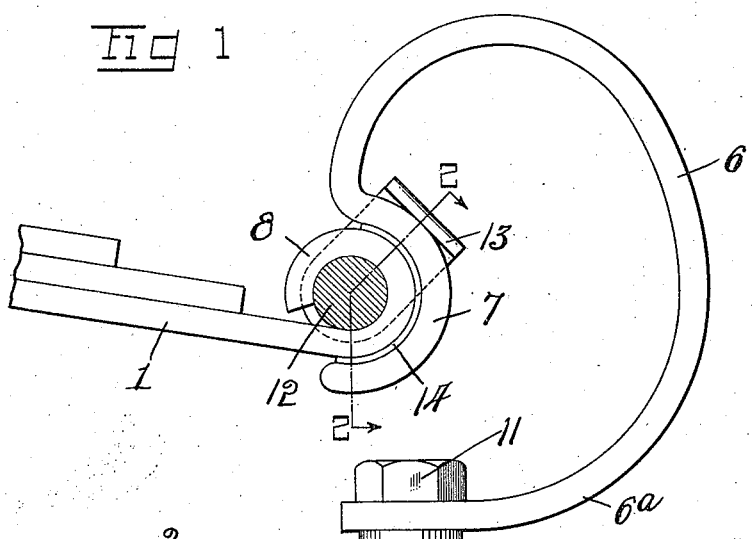
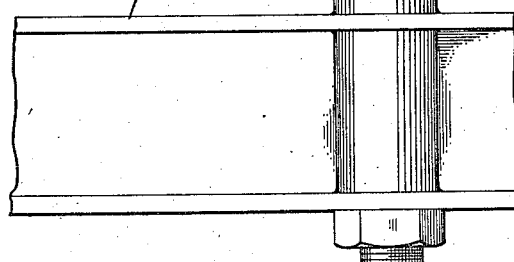
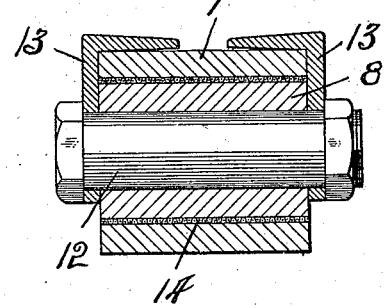
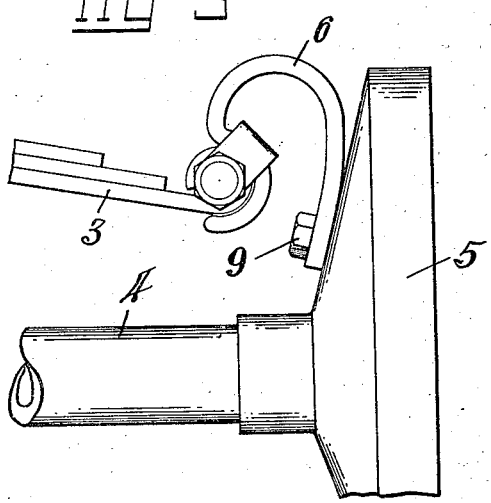
Inventor
Leland A. Tussing.
By Own Own & Crampton.
Attorneys Patented Feb. 8, 1927.

1,616,559

UNITED STATES PATENT OFFICE.

LELAND A. TUSSING, OF TOLEDO, OHIO.

SPRING SUSPENSION MEANS.

Application filed July 6, 1925. Serial No. 41,599.

This invention relates to spring suspension means for use particularly in connection with Ford automobiles, and has for its object the provision of yielding suspension means for the ends of the main cross springs of the vehicle, which means is simple and inexpensive in its construction, is capable of being easily and quickly applied and adapted to have fixed connection at one end with a convenient part of the chassis, and to have fixed connection at its one end with the adjacent spring end in a manner to avoid friction and the necessity of lubricating the contacting parts.

The invention is fully described in the following specification, and a preferred embodiment thereof illustrated in the accompanying drawings, in which, Fig. 1 is a side elevation of the spring suspension means embodying the invention operatively connecting an end of a front spring of the vehicle to the front axle, with parts broken away and in section. Fig. 2 is an enlarged section on the line 2—2 in Fig. 1, and Fig. 3 is a reduced elevation of portions of a rear spring and rear axle structure of a vehicle connected by the suspension means embodying the invention.

Referring to the drawings, 1 and 2 designate the front spring and axle, respectively, and 3 and 4 the rear spring and axle, respectively, of a Ford automobile, and 5 the customary brake drum housing on the rear axle. The spring suspension means embodying the invention are the same for the front and rear springs, except that one is adapted to be connected to the top of the front axle 2, while the other is adapted to be connected to the side of the drum housing 5.

The spring suspending means in each case preferably comprises a strip of spring material 6 of flat bar form the spring engaging end of which is formed to provide a spring engaging seat portion 7 of substantially semi-circular form and of a size to fit partially around and receive the cylindrical eye portion 8 of the vehicle spring. The suspending spring member 6 then extends upwardly, outwardly and downwardly in bowed form, and in the case of use in connection with the rear spring 3 of the vehicle has its outer end terminating in side abutting contact with the outer exposed side of the drum 5 and secured thereto by a bolt 9, or in any other suitable manner. In the case of use in connection with the front spring 1 of the vehicle, the suspending spring 6 has its inner end extending inwardly under its spring seating and 7, as shown at $6^a$, to adapt it to seat on the top of the perforated boss 10 of the front axle 2 and to be secured thereto by a bolt 11. It will be understood that in applying the spring suspending means to the vehicle the customary shackle means for the vehicle springs are first removed and the suspended springs attached to the parts to which the shackles were attached.

The spring seat or segmental portions 7 of the suspending springs 6 extend partially under the respective ends of the springs to which attached, and also have a spring thrust against the spring ends lengthwise of the springs, thereby tending to eliminate or reduce the side swaying action of the vehicle body and at the same time to serve as a yielding suspension for the vehicle springs so that shocks delivered to the suspending members 6 by the passage of the vehicle wheels over rough roads are largely reduced or absorbed by the suspending members before transmission to the vehicle springs.

The suspending member 6 and the end of the vehicle spring engaged thereby are rigidly secured together in seating relation by a bolt 12 and clamping clips 13 of L-form, the bolt being inserted through the eye portion 8 of the spring, being of a size to fill the same, and the clips 13 have perforated end portions through which the bolt projects. One clip is disposed at each side of the spring and has the angled portion thereof projecting over the inner side of the spring seating portion 7 of the suspension member. A tightening of the bolt draws the clips 13 firmly against the portions 7 and 8 to rigidly hold the same against relative movement, and this clamping action is facilitated by tapering the inwardly projecting end portions of the clips so as to have a wedging action over the portion 7. In order to prevent direct contact of the portions 7 and 8 and to eliminate any possibility of squeaking should there be a slight frictional movement between the parts when in use, it is preferable to place a thin fibre strip 14 between the seating surface of said portions.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is;

1. The combination with a vehicle spring having a circular eye portion in an end thereof, of a looped spring suspending member for the vehicle spring having a free end portion provided with a longitudinally extending segmental portion complemental to and adapted to form a seat for the circular end portion of the vehicle spring.

2. The combination with a vehicle spring having a circular eye portion in an end thereof, of a looped spring suspending member for the vehicle spring having a free end portion provided with a longitudinally extending segmental portion complemental to and adapted to form a seat for the circular end portion of the vehicle spring, and means for firmly clamping the vehicle spring and suspending member in seating relation.

3. The combination with a vehicle spring having a circular eye portion in an end thereof, of a looped spring suspending member for the vehicle spring having a free end portion provided with a longitudinally extending segmental portion complemental to and adapted to form a seat for the circular end portion of the vehicle spring, a bolt projecting through the eye portion of the vehicle spring, and clips carried by the bolt and cooperating therewith to firmly retain the vehicle spring and suspending member in seating relation.

4. In combination, a vehicle chassis, a cross body supporting spring above the chassis, said spring having an eye portion at each end, a looped suspending member of spring material for each end of the vehicle spring having a free end portion provided with a segmental seat for receiving the adjacent end portion of the spring and to form a support and also an outward end thrust bearing therefor, the suspending member thence extending upward, outward and downward in the form of a loop and being fixed at its other end to a part of the chassis, and means projecting through the eye of the spring and having clamping engagement with the seating portion of the suspending member to firmly retain the spring and member in seating relation.

In testimony whereof, I have hereunto signed my name to this specification.

LELAND A. TUSSING.